(12) United States Patent
Pan et al.

(10) Patent No.: US 7,324,442 B1
(45) Date of Patent: Jan. 29, 2008

(54) ACTIVE QUEUE MANAGEMENT TOWARD FAIR BANDWIDTH ALLOCATION

(75) Inventors: Rong Pan, Menlo Park, CA (US);
Balaji Prabhakar, Palo Alto, CA (US);
Konstantinos Psounis, Athens (GR)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 631 days.

(21) Appl. No.: 09/783,701

(22) Filed: Feb. 14, 2001

Related U.S. Application Data

(60) Provisional application No. 60/185,569, filed on Feb. 28, 2000.

(51) Int. Cl.
H04I 1/16 (2006.01)
H04L 12/28 (2006.01)

(52) U.S. Cl. ...................... 370/230; 370/412
(58) Field of Classification Search ............. 370/229, 370/230, 230.1, 232, 235, 412, 415, 416, 370/395.4, 395.41, 395.42, 395.43
See application file for complete search history.

(56) References Cited

U.S. PATENT DOCUMENTS

| | | | | |
|---|---|---|---|---|
| 5,450,397 A | * | 9/1995 | Wahlman | 370/411 |
| 5,699,520 A | * | 12/1997 | Hodgson et al. | 709/234 |
| 6,049,527 A | * | 4/2000 | Isoyama et al. | 370/235 |
| 6,463,068 B1 | * | 10/2002 | Lin et al. | 370/414 |
| 6,473,425 B1 | * | 10/2002 | Bellaton et al. | 370/392 |
| 6,515,963 B1 | * | 2/2003 | Bechtolsheim et al. | 370/229 |
| 6,556,578 B1 | * | 4/2003 | Silberschatz et al. | 370/412 |
| 6,606,301 B1 | * | 8/2003 | Muller et al. | 370/230 |
| 6,675,220 B1 | * | 1/2004 | Bergamasco et al. | 709/232 |
| 6,690,645 B1 | * | 2/2004 | Aweya et al. | 370/230 |
| 6,700,871 B1 | * | 3/2004 | Harper et al. | 370/235 |
| 6,724,721 B1 | * | 4/2004 | Cheriton | 370/229 |
| 6,744,767 B1 | * | 6/2004 | Chiu et al. | 370/395.21 |
| 6,829,224 B1 | * | 12/2004 | Goldman et al. | 370/252 |

OTHER PUBLICATIONS

Cho K., Flow valve: Embedding a safety valve in RED, 1999, IEEE, pp. 1753-1762.*
Balaji Prabhakar, CHOKe- simple approach for providing quality of service through stateless approximation of fair queueing, Mar. 1999, Technical Report ACM, pp. 1-24.*
Balaji Prabhakar, CHOKe a stateless mechanism for providing quality of service in the internet, 1999, Stanford university pp. 1-11.*
B. Braden, et al., "Recommendations on Queue Management and Congestion Avoidance in the internet," IETF RFC (Informational) 2309, Apr. 1998.
Bernhard Suter, "Efficient Active Queue Management for Internal Routers," *Interop 98*, 1998.
Dong Lin and Robert Morris, "Dynamics of Random Early Detection" revised from Proceedings of ACM SIGCOMM '97, pp. 127-137, 1997.

* cited by examiner

*Primary Examiner*—Steven Nguyen
(74) *Attorney, Agent, or Firm*—Crawford Maunu PLLC

(57) ABSTRACT

In a packet-queue management system, a bandwidth allocation approach fairly addresses each of n flows that share the outgoing link of an otherwise congested router. According to an example embodiment of the invention, a buffer at the outgoing link is a simple FIFO, shared by packets belonging to the n flows. A packet priority-reduction (e.g., packet dropping) process is used to discriminate against the flows that submit more packets/sec than is allowed by their fair share. This packet management process therefore attempts to approximate a fair queuing policy. The embodiment is advantageously easy to implement and can control unresponsive or misbehaving flows with a minimum overhead.

27 Claims, 2 Drawing Sheets

ACTIVE QUEUE MANAGEMENT TOWARD FAIR BANDWIDTH ALLOCATION

RELATED PATENT DOCUMENT

This is a conversion of Provisional Patent Application No. 60/185,569, filed Feb. 28, 2000, incorporated herein by reference.

FIELD OF THE INVENTION

The present invention relates generally to packet-type data communication protocols and, more specifically, to active management in the transport layer protocols, like TCP, for congestion avoidance.

BACKGROUND OF THE INVENTION

As a target application for the present invention, the Internet provides a connectionless, end-to-end packet service using an established IP protocol. Communication on the Internet depends on congestion avoidance mechanisms implemented in the transport layer protocols, like TCP, to provide good service under heavy load. However, either deliberately or by accident, many TCP implementations do not include a congestion-avoidance mechanism. Moreover, there are a growing number of UDP-based applications running in the Internet, such as packet voice and packet video, involving data flows that do not back off properly when they receive congestion indications. As a result, these applications aggressively use up more bandwidth than other TCP compatible flows. This could eventually cause "Internet Meltdown," for example as discussed in *Recommendations on Queue Management and Congestion Avoidance in the Internet*, by B. Braden et al., IETF RFC (Informational) 2309, April 1998, and *Data Networks*, by D. Bertsekas and R. Gallager, Second edition, Prentice Hall, 1992. To mitigate the severity of this problem, router mechanisms have been developed to shield responsive flows from unresponsive or aggressive flows and to provide a good quality of service (QoS) to all users.

Two types of router algorithms for achieving congestion control are broadly classified under the monikers "scheduling algorithms" and "queue management algorithms." A generic scheduling algorithm, exemplified by the well-known Fair Queuing (FQ) algorithm, looks for the buffer at each output of a router to be partitioned into separate queues each of which will buffer the packets of one of the flows. Packets from the flow buffers are placed on the outgoing line by a scheduler using an approximate bit-by-bit, round-robin discipline. Because the queuing of the packets is based on the respective packet flows, packets belonging to different flows are essentially isolated from each other and, advantageously, one flow cannot degrade the quality of another. Achieving this flow isolation, however, requires unduly complicated per-flow state information, thereby rendering implementations impracticable for many applications.

Specific scheduling algorithms have attempted to reduce both the operating complexities and the cost of maintaining flow state information. For example, in one method, routers are divided into two categories: edge routers and core routers. An edge router keeps per-flow state information and estimates each flow's arrival rate. These estimates are inserted into the packet headers and passed on to the core routers. A core router maintains a stateless FIFO queue and, during periods of congestion, drops a packet randomly based on the rate estimates. This scheme reduces the core router's design complexity, but the edge router's design is still overly complex. Also, because of the rate information in the header, the core routers have to extract packet information differently than traditional routers extract packet information; this additional packet-extraction step adds even further complexity. In an effort to approximate the FQ algorithm with less implementation complexity, another scheme uses a hash function to classify packets into a smaller number of queues than the number of queues used by the FQ algorithm. This approach, however, still requires around 1000 to 2000 queues in a typical router to approach the performance of the FQ algorithm.

The queue management class of router algorithms attempts to approximate fairness using a simpler design. An example of this class of algorithms is Random Early Detection ("RED"). A router algorithm implementing RED maintains a single FIFO to be shared by all the packet flows, and drops an arriving packet at random during periods of congestion. The probability of dropping a packet increases with the level of congestion. Since RED acts in anticipation of congestion, it does not suffer from "lock out" and "full Queue" problems described in "Recommendations on Queue Management and Congestion Avoidance in the Internet." By keeping the average queue-size small, RED reduces the degree of delays experienced by most typical flows. However, because the percentage of packets dropped from each flow over a period of time is almost the same, the ability of RED to penalize unresponsive flows is limited. Consequently, misbehaving traffic can take up a large percentage of the link bandwidth and starve out TCP-friendly flows.

Variations to the RED approach have attempted to improve the ability for distinguishing unresponsive users. However, these variants have typically incurred extra implementation overhead. One such variant stores information about unfriendly flows, and another requires information about active connections. Yet another approach stabilizes the occupancy of the FIFO buffer, independently of the number of active flows.

Accordingly, the scheduling-type router algorithms provide a fair bandwidth allocation but are often too complex for high-speed implementations and do not scale well to a large number of users. The queue-management router algorithms are relatively simple to implement but fail to penalize misbehaving flows and therefore do not provide bandwidth allocation with a comparable degree of fairness. Hybrid algorithms have provided compromises on fairness or have added undue complexity. In view of the classes of router algorithms manifesting the inability to provide both fairness and simple implementation simultaneously, as discussed in "Efficient Active Queue Management for Internet Routers," by B. Suter et al., *Interop* 98, it has been concluded that the two goals present opposing tensions and are unlikely to be realized at the same time.

SUMMARY OF THE INVENTION

The present invention is directed to systems and methods for actively managing a queue in an effort to provide a fair bandwidth allocation, for example, as applied to the types of applications addressed by the previously-discussed approaches. One aspect of the invention is directed to approximating fair queuing of packets using a minimal implementation overhead by reducing the priority of packets that have an identification corresponding to congestion flows. In systems having packet flows that are congestionsensitive, the approach advantageously inhibits "congestion-problem" flows (i.e., either congestion-insensitive flows or congestion-causing flows).

In one specific embodiment of the invention, queue management is realized in a flow-identification arrangement that is susceptible to unbalanced bandwidth allocation. The management approach involves detecting a matching flow identification between a recently-received incoming packet with at least one packet selected from a set of outgoing packets, and, in response to the matching flow identification detection, unbalanced bandwidth allocation is mitigated by reducing the processing priority of one or both of the selected packet(s), and the recently-received packet.

In another specific embodiment of the invention involving a flow-identification arrangement that is susceptible to unbalanced bandwidth allocation, queue management is realized using a stateless FIFO queue and a server including a CPU arrangement. The FIFO queue is configured and arranged to receive packets having associated flow identification information. The CPU arrangement in the server is adapted to detect a matching flow identification between a recently-received incoming packet with at least one packet selected from a set of outgoing packets, the packet being selected as a function of a random probability. In response to the matching flow identification detection, the CPU arrangement is further adapted to mitigate unbalanced bandwidth allocation without maintaining state information for the FIFO queue, by reducing the processing priority of said at least one selected packet and the recently-received packet.

Another more specific embodiment of the present invention is directed to bridging fairness and simplicity in active queue management. In this specific embodiment, active queue management algorithm is realized by differentially penalizing misbehaving flows by dropping more of their packets and without requiring management of state information for the FIFO buffer through which the packets flow. In this manner, by keeping packets of responsive flows and dropping packets of unresponsive flows, the embodiment aims to approximate max-min fairness for the flows that pass through a congested router. Using the FIFO buffer, the contents of the FIFO buffer are used to form a "sufficient statistic" about the incoming traffic and this statistic is used in a simple fashion to penalize misbehaving flows. When a packet arrives at a congested router, a packet is drawn randomly from the FIFO buffer and it is compared with the arriving packet. If the randomly-drawn packet and the arriving packet belong to the same flow, then they are both dropped. If the randomly-drawn packet and the arriving packet do not belong to the same flow, the randomly chosen packet is left intact and the arriving packet is admitted into the buffer with a probability that depends on the level of congestion. In this context, the allocation of the flows which consume the most resources are identified and reduced, thereby attempting to minimize the resource consumption of the maximum flow so as to achieve the degree of "minmax fairness" recognized by the previous approaches. The resource freed up as a result of minimizing the maximum flow's consumption is distributed among the other flows. In the Internet context, the former flows are either unfriendly TCP or UDP, and the latter flows are TCP.

The above summary is not intended to characterize every aspect, or each embodiment, contemplated in connection with the present invention. Other aspects and embodiments will become apparent from the discussion in connection with the figures which are introduced below.

BRIEF DESCRIPTION OF THE DRAWINGS

Various aspects and advantages of the present invention will become apparent upon reading the following detailed description of various embodiments and upon reference to the drawings in which.

Figure 1:
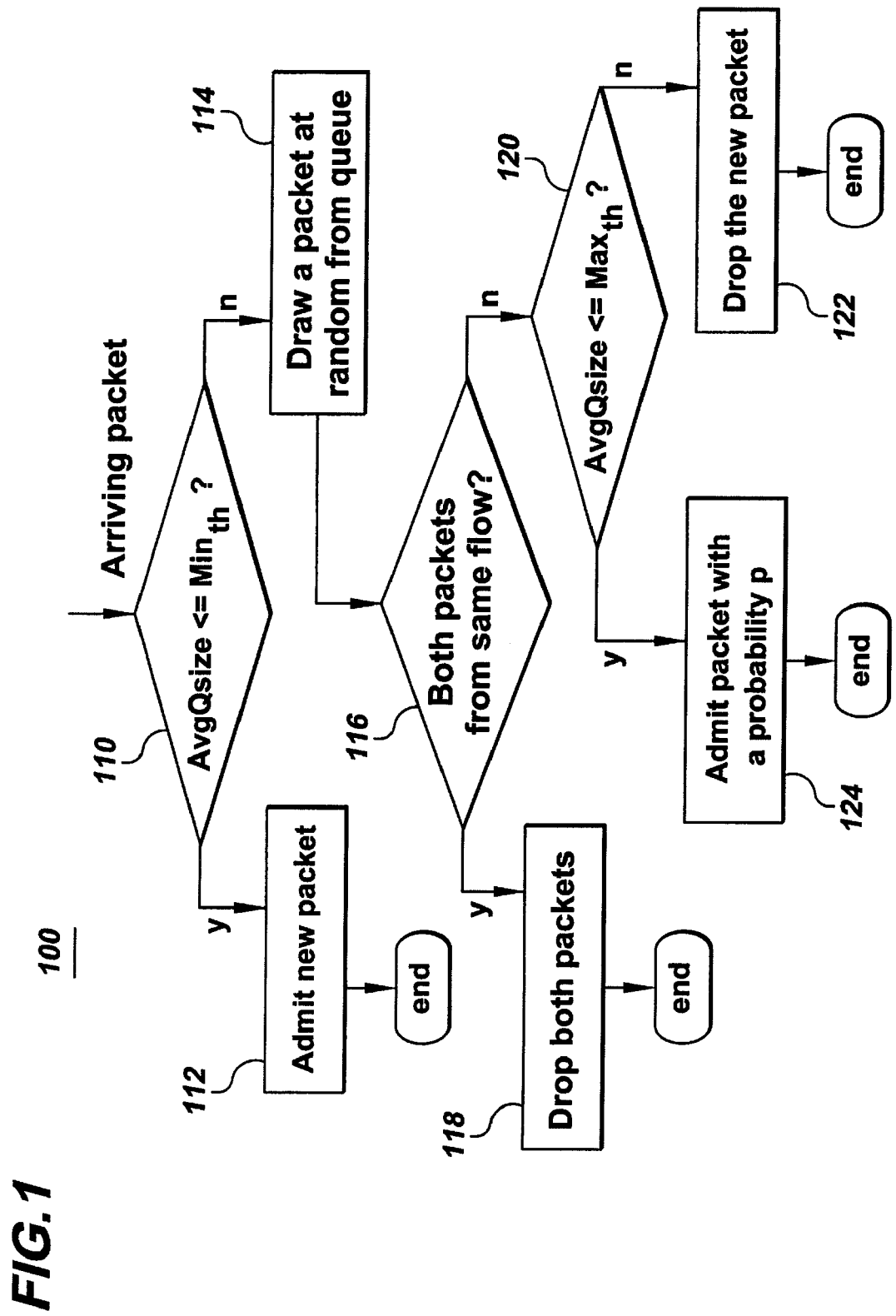
FIG. 1 is a flow diagram illustrating an example process flow for a router, according to example application of the present invention.

While the invention is amenable to various modifications and alternative forms, specifics thereof have been shown by way of example in the drawings and will be described in detail. It should be understood, however, that the intention is not to limit the invention to the particular embodiment described. On the contrary, the intention is to cover all modifications, equivalents, and alternatives falling within the spirit and scope of the invention as defined by the appended claims.

DETAILED DESCRIPTION

The present invention is believed to be applicable to a variety of systems and methods that route identification-bearing data sets (or "packets") in a communication environment that is susceptible to unbalanced bandwidth allocation. In connection with the Internet, for example, servers employ routers to distribute identification-bearing packets to a variety of remotely-located nodes. Each router receives and sends the packets through one or more first-in-first-out buffer/memory arrangements ("FIFOs"). Unbalanced bandwidth allocation can occur in a number of ways including, for example, by the router receiving and attempting to reply to a disproportionate number of packets of the same identification. An appreciation of the invention may be ascertained through the following discussion in the context of such example applications, in which those skilled in the art will appreciate that reference to a "packet" is not necessarily limited to a data set having a size that is fixed.

A first example embodiment of present invention is directed to packet router applications, such as the Internet, in which packets belonging to a misbehaving flow are received by the router relatively often. In connection with the present invention, it has been discovered that the router's FIFO buffer is more likely to have packets belonging to the misbehaving flow and hence these packets are more likely to be chosen for comparison in a process attempting to mitigate congestion. The intersection of these two high probability events is used to identify packets belonging to misbehaving flows and that should have their processing priority significantly reduced, or dropped. In one such embodiment, as needed, packets of misbehaving flows are dropped more often than packets of well-behaved flows; thereby, differentially penalizing "unfriendly" or "unresponsive" flows. Further, various implementations of the present invention are adapted to avoid global synchronization to keep buffer occupancies small and ensure low delays, and not to bias against bursty traffic.

Various embodiments of the present invention can be implemented as a stateless algorithm that achieves flow isolation and/or approximates fair bandwidth allocation. By implementing a stateless queue management approach, undue complexity associated with previously-implemented algorithms is avoided which, in turn, permits these embodiments of the present invention to be implemented readily as software patches (e.g., supplemental or replacement sections) for new and existing queue management schemes.

In accordance with an exemplary embodiment of the present invention, FIG. 1 illustrates an example process flow 100 for a router maintaining a single FIFO buffer for queuing the packets of all the flows that share an outgoing link. The illustrated process flow differentially penalizes unresponsive and unfriendly flows. The state, taken to be the number of active flows and the flow identity of each of the packets, is assumed to be unknown to the algorithm; however, the total occupancy of the buffer is determined as described below.

The example process flow of FIG. 1 determines or calculates the average occupancy of the FIFO buffer and marks two thresholds on the buffer, a minimum threshold $min_{th}$ and a maximum threshold $max_{th}$. One of various acceptable ways to determine this average occupancy is using an exponential moving average. If the average queue size is less than $min_{th}$, as depicted at decision block 110 of FIG. 1, the packet arriving at block 110 proceeds to block 112. At block 112, each arriving packet is queued into the FIFO buffer. If the aggregated arrival rate is smaller than the output link capacity, the average queue size should not build up to $min_{th}$ very often and packets are, therefore, not dropped frequently. If the average queue size is greater than $max_{th}$, every arriving packet is dropped. This moves the queue occupancy back to below $max_{th}$. When the average queue size is bigger than the $min_{th}$, as depicted in the negative branch extending from the decision block 110, the next task involves where randomly selecting a packet from the queue (or FIFO buffer) as depicted at block 114. At block 116, the arriving packet is compared with the randomly selected packet. This randomly selected packet is referred to as the drop candidate packet. If the drop candidate packet and the arriving packet have the same flow ID (identification), both are dropped as depicted at block 118. If the drop candidate packet and the arriving packet do not have the same flow ID, the randomly-chosen packet is kept in the buffer (e.g., in the same position as before) and the arriving packet is dropped with a probability that depends on the average queue size relative to the maximum threshold $max_{th}$.

As depicted in connection with decision block 120 of FIG. 1, in one specific embodiment, the drop probability is "one" if the packets arrive when the average queue size exceeds the $max_{th}$. To bring the queue occupancy back to below the $max_{th}$ as fast as possible, from blocks 116 and 120, if the queue size is not less than the $max_{th}$, at block 122 the packets are dropped from the queue. From block 120, if the queue size is at least the $max_{th}$, block 124 involves admitting the arriving packet to the queue with an optional calculated probability of "p". For a discussion of a related probability calculation and/or a related calculation of the average occupancy of the FIFO buffer using an exponential moving average, reference may be made to D. Lin and R. Morris, "Dynamics of Random Early Detection," Proceedings of ACM SIGCOMM '97, pp. 127-137, Oct. 1997.

In general, m packets are chosen from the buffer, where m>1, and each of the m packets are compared with the incoming packet, and the packets that have the same flow ID as the incoming packet have their processing priority reduced (e.g., dropped). Choosing more than one drop candidate packet improves the performance of the bandwidth allocation, especially when there are multiple unresponsive flows.

It has also been discovered in connection with the present invention that, as the number of unresponsive flows increases, it is effective to choose to drop more candidate packets. Accordingly, in connection with another embodiment of the present invention, the above-described process flow is modified in that a selected increased number of candidate packets are dropped in a manner that corresponds to an increased detected number of unresponsive flows. When implementing an embodiment of the present invention as a stateless design, there is not priori knowledge of how many unresponsive flows are active at any time for choosing a suitable value for m. However, yet another aspect of the present invention can be implemented to permit the process to be automated so that the algorithm chooses the proper value of $m \geq 1$. One way of achieving this is to introduce an intermediate threshold $int_{th}$ which partitions the interval between the $min_{th}$ and $max_{th}$ into two regions. For example, when the average buffer occupancy is between the $min_{th}$ and $int_{th}$, the algorithm sets m=1 and when the average buffer occupancy is between the $min_{th}$ and $max_{th}$ the algorithm sets m=2. When the buffer occupancy exceeds $max_{th}$, m remains the same but each incoming packet is dropped. More generally, multiple thresholds can be introduced to partition the interval between the $min_{th}$ and $max_{th}$ into k regions $R_1$, $R_2, \ldots R_k$ and choose different values of m depending on the region of the average buffer occupancy falls in. For example, choose m=2·i (i=1, . . . k), when the average queue size lies in region $R_1$, and let m increase monotonically with the average queue size.

The algorithm does not require an elaborate data structure. Compared to a pure FIFO queue, there are just a few simple extra operations that the algorithm performs: drawing a packet randomly from the queue, comparing flow IDs, and possibly dropping both the incoming and the candidate packets. When implemented as a stateless algorithm, these few extra operations are simply implemented. For example, an example detailed implementation involves drawing a packet at random by generating a random address from which a packet flow ID is read out. Flow ID comparison is then done easily in hardware logic using multiple bit comparators. Because dropping a randomly chosen packet means removing the packet from a linked-list, which can be relatively difficult, instead, one extra bit can be added to the packet header. The bit is set to one if the drop candidate is to be dropped. When a packet advances to the head of the FIFO buffer, the status of this bit determines whether it is to be immediately discarded or transmitted on the outgoing line.

Figure 2:
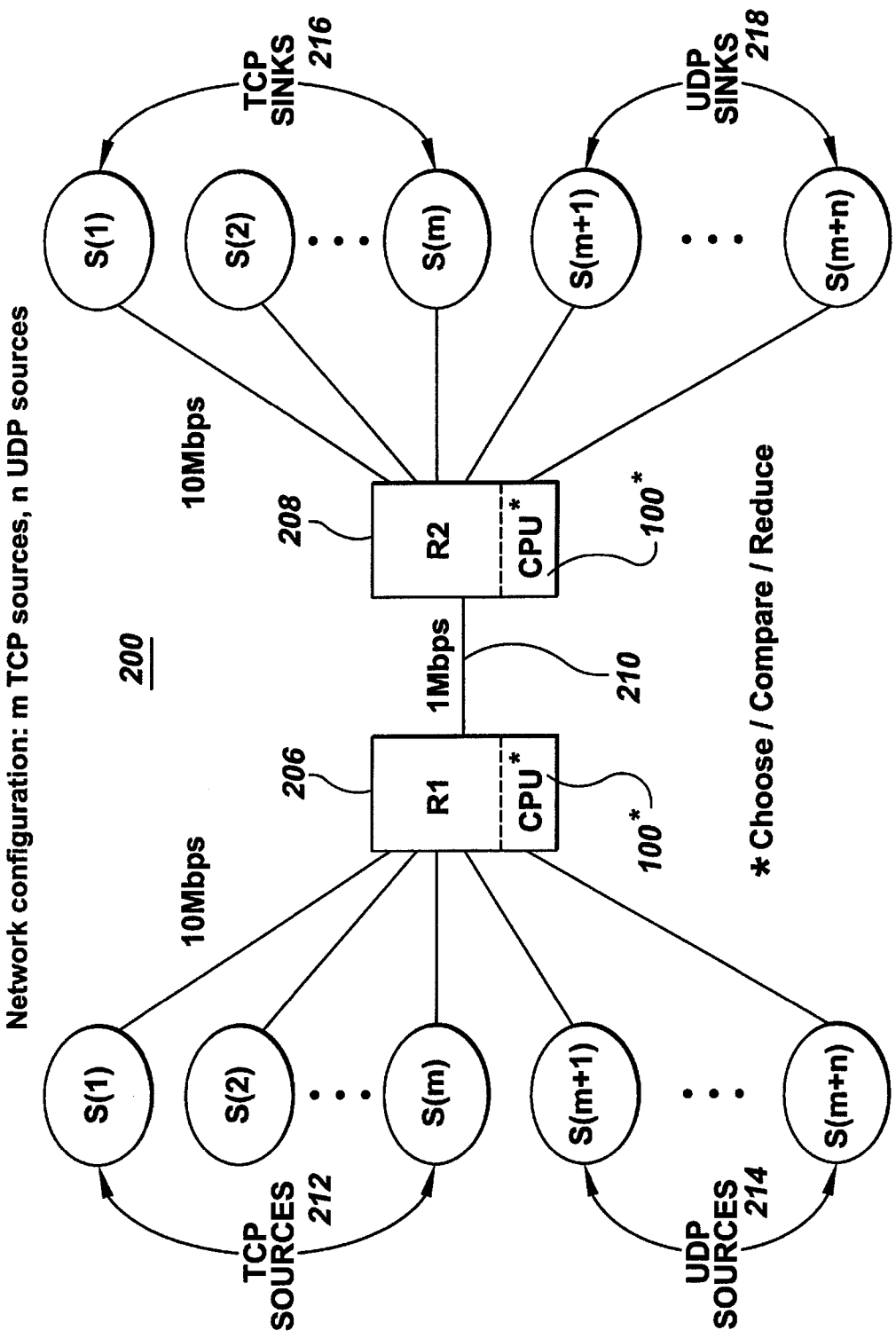
FIG. 2 is a diagram of a network configured according to an example embodiment of the present invention, and that may be used in connection with the flow diagram illustrated in FIG. 1.

As mentioned above, the present invention is applicable to a spectrum of network configurations and traffic mixes, and to a variety of application types that route identification-bearing data sets (or "packets") in a communication environment. These communication environments include but are not necessarily limited to single and multiple congested links and single and multiple misbehaving flows. FIG. 2 illustrates one such environment in which a network 200 is configured with one or both routers 206 and 208 (R1 and R2) having a CPU programmed with process flow 100 to choose and drop packets as described in connection with one of the above queue management implementations. The network 200 has a single link 210, between the routers 206 and 208, that is susceptible to undesirable levels of congestion. In this example environment, the link 210 has a capacity of one Mbps and is shared by m TCP and n UDP flows, depicted by the corresponding sources 212, 214 and corresponding sinks 216 and 218. An end host (not illustrated) is connected to the routers using a ten-Mbps link, which is ten times the bottleneck link bandwidth. All links have a small propagation delay of one millisecond so that the delay experienced by a packet is mainly caused by the buffer delay rather than the transmission delay. The maximum window size of TCP is set to three hundred such that it does not become a limiting factor of a flow's throughput. The TCP flows are derived from FTP sessions that transmit large sized files. The UDP hosts send packets at a constant bit rate (CBR) of r Kbps, where r is a positive integer variable. All packets are set to have a size of 1 K Bytes. For a discussion of performance and other related application-specific details, reference may be made to the article entitled, "CHOKe: A stateless active queue management scheme for approximating fair bandwidth allocation," as was filed in the above-referenced Provisional Patent Document, U.S. application Ser. No. 60/185,569 filed on Feb. 28, 2000.

While some of the above-discussed embodiments involve choosing the drop candidate packet from the queue in a manner that is based on a random probability, alternative embodiments involve choosing the drop candidate packet in other manners. For example, the drop candidate packet can be chosen always as the packet at the head of the queue, and in yet another embodiment, chosen always as the packet at the tail of the queue. These last two variations are reasonable approximations of the embodiments which choose the drop candidate packet from the queue randomly. The above-referenced article in the underlying provisional patent document further discusses these last two variations.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes include, but are not necessarily limited to other network configurations and to other approximations of the random probability for choosing the drop candidate packet from the queue. Such modifications and changes do not depart from the true spirit and scope of the present invention that is set forth in the following claims.

What is claimed is:

1. A method for managing a queue susceptible to unbalanced bandwidth allocation, comprising:
   detecting a matching flow identification between a recently-received incoming packet with at least one packet selected from a set of outgoing packets; and
   in response, mitigating unbalanced bandwidth allocation due to congestion-problem flows by reducing the processing priority of at least one of: said at least one selected packet, and the recently-received packet, wherein the incoming packet is not a retransmission of said at least one selected packet.

2. The method of claim 1, wherein detecting the matching flow identification includes comparing the flow identification of the recently-received incoming packet with the flow identification of said at least one packet selected from a set of outgoing packets, and wherein step of detecting the matching flow identification is responsive to the comparison.

3. The method of claim 1, further including quantifying congestion-problem flows, and assigning a processing priority to the quantified congestion-problem flows as a function of the quantification.

4. The method of claim 3, wherein the processing priority includes dropping more candidate packets as the number of unresponsive flows increases, and wherein mitigating unbalanced bandwidth allocation and reducing the processing priority includes using a stateless FIFO queue, and further including quantifying unresponsive flows, and dropping more candidate packets as the number of unresponsive flows increases.

5. The method of claim 1, further including selecting said at least one packet from the set of outgoing packets as a function of a random probability.

6. The method of claim 1, wherein said at least one packet includes a plurality of packets.

7. The method of claim 1, wherein reducing the processing priority includes dropping said at least one selected packet.

8. The method of claim 1, wherein reducing the processing priority includes dropping the recently-received packet.

9. The method of claim 1, further including selecting said at least one packet from the set of outgoing packets as a function of a probability corresponding to the location of the selected packet in the queue.

10. The method of claim 1, further including selecting said at least one packet from the set of outgoing packets as a function of a probability corresponding to a misbehaving flow.

11. A method for managing a queue susceptible to unbalanced bandwidth allocation, comprising:
    selecting a packet subset from the set of outgoing packets as a function of a probability corresponding to at least one of: a misbehaving flow, and the location of the selected packet in the queue;
    comparing a recently-received incoming packet with the selected packet subset and detecting therefrom a matching flow identification; and
    in response, mitigating unbalanced bandwidth allocation due to congestion-problem flows by dropping the processing priority of at least one of: the selected packet subset, and the recently-received packet.

12. A system for managing a queue susceptible to unbalanced bandwidth allocation, comprising:
    means for detecting a matching flow identification between a recently-received incoming packet with at least one packet selected from a set of outgoing packets; and
    means, responsive to the detection means, for mitigating unbalanced bandwidth allocation due to congestion-problem flows by reducing the processing priority of at least one of: said at least one selected packet, and the recently-received packet.

13. A system for managing a queue in a flow-identification arrangement susceptible to unbalanced bandwidth allocation, comprising:
    a server including a CPU arrangement programmed and arranged to
      detect a matching flow identification between a recently-received
      incoming packet with at least one packet selected from a set of outgoing packets; and
        in response to the matching flow identification detection, mitigate unbalanced bandwidth allocation due to congestion-problem flows by reducing the processing priority of at least one of: said at least one selected packet, and the recently-received packet, wherein the incoming packet is not a retransmission of said at least one selected packet.

14. The system of claim 13, wherein the server is an Internet server adapted to prioritize the flow of packets in a queue according to identification codes associated with the respective packets.

15. The system of claim 13, further including selecting said at least one packet from the set of outgoing packets as a function of a random probability.

16. The system of claim 13, further including selecting said at least one packet from the set of outgoing packets as a function of a probability corresponding to the location of said at least one selected packet in the queue.

17. The system of claim 13, further including selecting said at least one packet from the set of outgoing packets as a function of a probability corresponding to a misbehaving flow.

18. The system of claim 13, wherein the system is a network router node that routes internet protocol packets between other nodes in the network.

19. The system of claim 18, including another communicatively-coupled server that is not adapted to detect a matching flow identification between a recently-received incoming packet with at least one packet selected from a set of outgoing packets, and, in response to the matching flow identification detection, to mitigate unbalanced bandwidth allocation by reducing the processing priority of at least one of said at least one selected packet and the recently-received packet.

20. A system for managing a queue susceptible to unbalanced bandwidth allocation, comprising:
    a server including a CPU arrangement programmed and arranged to
        detect a matching flow identification between a recently-received incoming packet with at least one packet selected from a set of outgoing packets, the packet being selected as a function of a probability corresponding to a misbehaving flow; and
        in response, mitigate unbalanced bandwidth allocation due to congestion-problem flows without maintaining state information and by reducing the processing priority of at least one of: said at least one selected packet, and the recently-received packet.

21. The system of claim 20, wherein the CPU arrangement is further programmed and arranged to choose to drop more candidate packets as the number of unresponsive flows increases.

22. A system for managing a queue in a flow-identification arrangement susceptible to unbalanced bandwidth allocation, comprising:
    a stateless FIFO queue configured and arranged to receive packets having associated flow identification information;
    a server including a CPU arrangement programmed and arranged to
        detect a matching flow identification between a recently-received incoming packet with at least one packet selected from a set of outgoing packets, the packet being selected as a function of at least one of a random probability and the location of the selected packet in the queue; and
        in response to the matching flow identification detection, mitigating unbalanced bandwidth allocation without maintaining state information for the FIFO queue and by reducing the processing priority of said at least one selected packet and the recently-received packet.

23. The system of claim 22, wherein the CPU arrangement is further programmed and arranged to choose to drop more candidate packets as the number of unresponsive flows increases.

24. A method for managing a queue susceptible to unbalanced bandwidth allocation, comprising:
    comparing a flow identification of a recently-received incoming packet with a flow identification of at least one packet selected from a set of outgoing packets;
    detecting, in response to the comparison, a matching flow identification between the recently-received incoming packet with said at least one packet selected from the set of outgoing packets;
    quantifying congestion-problem flows, and assigning a processing priority to the quantified congestion-problem flows as a function of the quantification; and
    in response, mitigating unbalanced bandwidth allocation due to congestion-problem flows by reducing the processing priority of at least one of: said at least one selected packet, and the recently-received packet.

25. The method of claim 24, wherein the processing priority includes dropping more candidate packets as the number of unresponsive flows increases.

26. The method of claim 24, further including selecting said at least one packet from the set of outgoing packets as a function of a random probability.

27. The method of claim 24, wherein said at least one packet includes a plurality of packets.

* * * * *

UNITED STATES PATENT AND TRADEMARK OFFICE
CERTIFICATE OF CORRECTION

PATENT NO. : 7,324,442 B1  
APPLICATION NO. : 09/783701  
DATED : January 29, 2008  
INVENTOR(S) : Pan et al.

Page 1 of 1

It is certified that error appears in the above-identified patent and that said Letters Patent is hereby corrected as shown below:

<u>In the Specification</u>

Col. 6, line 13: "$m \geqq 1$" should read --$m \geq 1$--.

<u>In the Claims</u>

Col. 8, line 20, Claim 13: should read
--A system for managing a queue in a flow-identification arrangement susceptible to unbalanced bandwidth allocation, comprising:
  a server including a CPU arrangement programmed and arranged to
    detect a matching flow identification between a recently-received incoming packet with at least one packet selected from a set of outgoing packets; and
  in response to the matching flow identification detection, mitigate unbalanced bandwidth allocation due to congestion-problem flows by reducing the processing priority of at least one of: said at least one selected packet, and the recently-received packet, wherein the incoming packet is not a retransmission of said at least one selected packet.--.

Signed and Sealed this

Seventh Day of April, 2009

JOHN DOLL  
*Acting Director of the United States Patent and Trademark Office*